United States Patent
Fayyaz et al.

(10) Patent No.: US 12,306,906 B2
(45) Date of Patent: May 20, 2025

(54) ADAPTIVE TOKEN SAMPLING FOR EFFICIENT TRANSFORMER

(71) Applicant: Microsoft Technology Licensing, LLC, Redmond, WA (US)

(72) Inventors: Mohsen Fayyaz, Bonn (DE); Soroush Abbasi Koohpayegani, Baltimore, MD (US); Eric Chris Wolfgang Sommerlade, Oxford (GB); Hamidreza Vaezi Joze, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 729 days.

(21) Appl. No.: 17/525,908

(22) Filed: Nov. 14, 2021

(65) Prior Publication Data

US 2023/0153379 A1 May 18, 2023

(51) Int. Cl.
  G06F 18/2113 (2023.01)
  G06F 18/24 (2023.01)
  G06N 3/04 (2023.01)

(52) U.S. Cl.
  CPC .......... *G06F 18/2113* (2023.01); *G06F 18/24* (2023.01); *G06N 3/04* (2013.01)

(58) Field of Classification Search
  CPC .... G06F 18/2113; G06F 18/24; G06F 40/284; G06F 40/30; G06F 40/216; G06F 16/35; G06F 18/214; G06F 40/117; G06F 40/126; G06F 40/131; G06N 3/04; G06N 3/045; G06N 3/0464; G06N 3/0985; G06N 3/082; G06N 3/08; G06N 20/00; G06N 3/044; G06N 3/047; G06N 3/084; G06N 3/006; G06N 3/0455; G06N 3/048; G06N 3/088;
  (Continued)

(56) References Cited

U.S. PATENT DOCUMENTS 11,288,534 B2 * 3/2022 Choi ................ G06V 10/56
11,531,863 B1 * 12/2022 Zweig ................ G06F 40/30
(Continued)

OTHER PUBLICATIONS

"BERT (language model)," available at https://en.wikipedia.org/wiki/BERT_(language_model), Wikipedia article, accessed on Feb. 14, 2024, 6 pages.
(Continued)

*Primary Examiner* — Michael S Osinski

(57) ABSTRACT

A transformer is described herein for using transformer-based technology to process data items (e.g., image items). The transformer increases the efficiency of the transformer-based technology by using a modified attention component. In operation, the modified attention component accepts embedding vectors that represent a plurality of item tokens, together with a classification token. A first stage of the modified attention component generates original attention information based on the embedding vectors. A second stage generates score information based on a portion of the original attention information that pertains to the classification token. A third stage produces modified attention information by removing attention values from the original attention information, as guided by a sampling operation that is performed on the score information. The second and third stages do not rely on machine-trained values, which expedites the deployment of these functions in existing transformers.

20 Claims, 8 Drawing Sheets

(58) Field of Classification Search
CPC ........ G06N 3/09; G06N 3/092; G06V 10/225; G06V 10/40; G06V 10/774; G06V 10/82; G06V 30/10
See application file for complete search history.

(56) References Cited

U.S. PATENT DOCUMENTS

| | | | | |
|---|---|---|---|---|
| 11,604,847 | B2* | 3/2023 | Raichelgauz | G06N 7/01 |
| 11,615,292 | B2* | 3/2023 | Zhang | G06T 11/60 |
| | | | | 382/159 |
| 11,663,488 | B2* | 5/2023 | Volkovs | G06N 20/00 |
| | | | | 712/7 |
| 11,763,094 | B2* | 9/2023 | Reisswig | G06F 40/117 |
| | | | | 704/9 |
| 11,941,496 | B2* | 3/2024 | Bhide | G06N 5/04 |
| 12,039,272 | B2* | 7/2024 | Arvela | G06F 16/355 |
| 12,149,699 | B2* | 11/2024 | Su | H04N 19/136 |
| 2018/0157743 | A1* | 6/2018 | Hori | G06F 16/35 |
| 2018/0300400 | A1* | 10/2018 | Paulus | G06N 3/044 |
| 2020/0342316 | A1* | 10/2020 | Shazeer | G06N 3/045 |
| 2021/0365723 | A1* | 11/2021 | Wagner | G06N 20/00 |
| 2022/0051080 | A1* | 2/2022 | Hajarnis | G06N 3/08 |
| 2022/0114476 | A1* | 4/2022 | Bui | G06N 3/044 |
| 2022/0197961 | A1* | 6/2022 | Baek | G06N 3/044 |
| 2022/0246244 | A1* | 8/2022 | Kappel | G06N 3/048 |
| 2022/0327809 | A1* | 10/2022 | Li | G06F 40/284 |
| 2022/0366144 | A1* | 11/2022 | Reisswig | G06F 40/284 |
| 2022/0398071 | A1* | 12/2022 | Allamanis | G06N 3/084 |
| 2023/0077498 | A1* | 3/2023 | Kimura | G06V 10/82 |
| | | | | 382/157 |
| 2023/0119186 | A1* | 4/2023 | O'Donoghue | G06N 3/08 |
| | | | | 706/21 |
| 2023/0129274 | A1* | 4/2023 | Kurokawa | G06V 10/774 |
| | | | | 382/159 |
| 2023/0140338 | A1* | 5/2023 | Hwang | G06F 40/284 |
| | | | | 704/9 |
| 2023/0144499 | A1* | 5/2023 | Jun | G06N 3/02 |
| | | | | 341/50 |
| 2023/0161653 | A1* | 5/2023 | Kim | G06N 3/04 |
| | | | | 714/1 |
| 2023/0195600 | A1* | 6/2023 | Clement | G06F 11/3636 |
| | | | | 717/128 |
| 2023/0419102 | A1* | 12/2023 | Truong | G06N 3/0464 |
| 2024/0070479 | A1* | 2/2024 | Sharma | G06N 3/08 |
| 2024/0119057 | A1* | 4/2024 | Unsal | G06F 16/38 |
| 2024/0202499 | A1* | 6/2024 | Liang | G06F 40/56 |
| 2024/0233416 | A1* | 7/2024 | Zhang | G06V 10/772 |
| 2024/0235577 | A1* | 7/2024 | Zhang | H03M 7/3079 |
| 2024/0371520 | A1* | 11/2024 | Vincent Salomon | |
| | | | | G06V 20/695 |

OTHER PUBLICATIONS

Walmer, et al., "Teaching Matters: Investigating the Role of Supervision in Vision Transformers," in CVF open access version of 2023 IEEE/CVF Conference on Computer Vision and Pattern Recognition (CVPR), Jun. 2023, pp. 7486-7496.
Search Report and Written Opinion for PCT/US2022/041769, mailed in Dec. 2022, 16 pages.
Fayyaz, et al., "Adaptive Token Sampling for Efficient Vision Transformers," in Avidan, et al. (Eds.) Computer Vision—ECCV 2022, ECCV 2022, Lecture Notes in Computer Science, vol. 13671, Oct. 2022, pp. 396-414.
Fayyaz, et al., "Adaptive Token Sampling For Efficient Vision Transformers Supplementary Document," available at https://static-content.springer.com/esm/chp%3A10.1007%2F978-3-031-20083-0_24/MediaObjects/539938_1_En_24_MOESM1_ESM.pdf, Oct. 2022, 10 pages.
Fayyaz, et al., "Adaptive Token Sampling For Efficient Vision Transformers," in arXiv, arXiv:2111.15667v3 [cs.CV], Jul. 26, 2022, 28 pages.
Kim, et al., "Learned Token Pruning for Transformers," in arXiv, arXiv:2107.00910v2 [cs.CL], Sep. 23, 2021, 14 pages.
Liang, et al., "EViT: Expediting Vision Transformers via Token Reorganizations," available at https://openreview.net/references/pdf?id=EzNODF0csg, OpenReview.net, modified on Oct. 5, 2021, accessed on Dec. 5, 2022, 14 pages.
Bertasius, et al., "Is Space-Time Attention All You Need for Video Understanding?," in Proceedings of the 38th International Conference on Machine Learning, PMLR vol. 139, Jul. 2021, 12 pages.
Bulat, et a., "Space-time Mixing Attention for Video Transformer," in 35th Conference on Neural Information Processing Systems (NeurIPS 2021), Dec. 2021, 14 pages.
Carreira, et al., "A Short Note about Kinetics-600," in arXiv, arXiv:1808.01340v1 [cs.CV], Aug. 3, 2018, 6 pages.
Child, et al., "Generating Long Sequences with Sparse Transformers," in arXiv, arXiv:1904.10509v1 [cs.LG], Apr. 23, 2019, 10 pages.
Diba, A., et al., "Spatio-Temporal Channel Correlation Networks for Action Classification," in V. Ferrari et al. (eds), Computer Vision—ECCV 2018, ECCV 2018, Lecture Notes in Computer Science., vol. 11208, 2018, pp. 299-315.
Diba, et al., "Large Scale Holistic Video Understanding," in Vedaldi, et al. (eds.), Computer Vision—ECCV 2020, ECCV 2020, Lecture Notes in Computer Science, vol. 12350, Aug. 2020, 17 pages.
Diba, et al., "DynamoNet: Dynamic Action and Motion Network," Open Access version of paper in 2019 IEEE/CVF International Conference on Computer Vision (ICCV), Oct. 2019, 10 pages.
Fan, et al., "Multiscale Vision Transformers," Open Access version of paper in 2021 IEEE/CVF International Conference on Computer Vision (ICCV), Oct. 2021, 12 pages.
Fan, et al., "More Is Less: learning Efficient Video Representations by Temporal Aggregation Modules," in arXiv, arXiv:1912.00869v1 [cs.CV], Dec. 2, 2019, 11 pages.
Fayyaz, et al., "3D CNNs with Adaptive Temporal Feature Resolutions," Open Access version of paper in 2021 IEEE/CVF Conference on Computer Vision and Pattern Recognition (CVPR), Jun. 2021, 10 pages.
Feichtenhofer, Christoph, "X3D: Expanding Architectures for Efficient Video Recognition," Open Access version of paper in 2020 IEEE/CVF Conference on Computer Vision and Pattern Recognition (CVPR), Jun. 2020, 11 pages.
Feichtenhofer, et al., "SlowFast Networks for Video Recognition," Open Access version of paper in IEEE/CVF International Conference on Computer Vision (ICCV), Oct. 2019, 10 pages.
Jaszczur, et al., "Sparse is Enough in Scaling Transformers," in 35th Conference on Neural Information Processing Systems (NeurIPS 2021), Dec. 2021, 13 pages.
Jiang, et al., "STM: SpatioTemporal and Motion Encoding for Action Recognition," Open Access Version of paper in 2019 IEEE/CVF International Conference on Computer Vision (ICCV), Oct. 2019, 10 pages.
Kay, et al. "The Kinetics Human Action Video Dataset," in arXiv, arXiv:1705.06950v1 [cs.CV], May 19, 2017, 22 pages.
Li, et al., "TEA: Temporal Excitation and Aggregation for Action Recognition," Open Access version of paper in 2020 IEEE/CVF Conference on Computer Vision and Pattern Recognition (CVPR), Jun. 2020, 10 pages.
Liang, et al., "Not All Patches are What You Need: Expediting Vision Transformers via Token Reorganizations," in arXiv, arXiv:2202.07800v2 [cs.CV], Apr. 13, 2022, 21 pages.
Lin, et al., "TSM: Temporal Shift Module for Efficient Video Understanding," Open access version of paper in 2019 IEEE/CVF International Conference on Computer Vision (ICCV), Oct. 2019, 11 pages.
Marin, et al., "Token Pooling in Vision Transformers," in arXiv:2110.03860v2 [cs.CV], Oct. 11, 2021, 21 pages.
Pan, et al., "IA-RED2: Interpretability-Aware Redundancy Reduction for Vision Transformers," in 35th Conference on Neural Information Processing Systems (NeurIPS 2021), Dec. 2021, 14 pages.
Qiu, et al., "Learning Spatio-Temporal Representation with Local and Global Diffusion," Open Access version of paper in 2019

(56) References Cited

OTHER PUBLICATIONS

IEEE/CVF Conference on Computer Vision and Pattern Recognition (CVPR), Jun. 2019, 10 pages.
Roy, et al., "Efficient Content-Based Sparse Attention with Routing Transformers," in Transactions of the Association for Computational Linguistics, vol. 9, available online in Feb. 2021, pp. 53-68.
Sukhbaatar, et al., "Adaptive Attention Span in Transformers," in Proceedings of the 57th Annual Meeting of the Association for Computational Linguistics, Jul. 2019, pp. 331-335.
Tran, et al., "Learning Spatiotemporal Features with 3D Convolutional Networks," Open Access version of paper in 2015 IEEE International Conference on Computer Vision (ICCV), 2015, 9 pages.
Tran, et al., "Video Classification with Channel-Separated Convolutional Networks," Open Access version of paper in 2019 IEEE/CVF International Conference on Computer Vision (ICCV), Oct. 2019, 10 pages.
Tran, et al., "A Closer Look at Spatiotemporal Convolutions for Action Recognition," Open Access version of paper in 2018 IEEE/CVF Conference on Computer Vision and Pattern Recognition, 2018, 10 pages.
Wang, et al., "Video Modeling with Correlation Networks," Open Access version of paper in 2020 IEEE/CVF Conference on Computer Vision and Pattern Recognition (CVPR), Jun. 2020, 10 pages.
Wang, et al., "Non-local Neural Networks," Open Access version of paper in 2018 IEEE/CVF Conference on Computer Vision and Pattern Recognition, 2018, 10 pages.
Yue, et al., "Vision Transformer with Progressive Sampling," Open Access version of paper in 2021 IEEE/CVF International Conference on Computer Vision (ICCV), Oct. 2021, 10 pages.
Fayyaz, et al., "ATS: Adaptive Token Sampling For Efficient Vision Transformers," in arXiv e-prints, arXiv:2111.15667v1 [cs.CV], Nov. 30, 2021, 20 pages.
Chen, et al., "CrossViT: Cross-Attention Multi-Scale Vision Transformer for Image Classification," in arXiv e-prints, arXiv:2103.14899v2 [cs.CV], Aug. 22, 2021, 12 pages.
Chu, et al., "Conditional Positional Encodings for Vision Transformers," in arXiv e-prints, arXiv:2102.10882v2 [cs.CV], Mar. 18, 2021, 13 pages.
Deng, e al., "ImageNet: A Large-Scale Hierarchical Image Database," in 2009 IEEE Conference on Computer Vision and Pattern Recognition, 2009, pp. 248-255.
Dosovitskiy, et al., "An Image is Worth 16—16 Words: Transformers for Image Recognition at Scale," available at https://openreview.net/forum?id=YicbFdNTTy, in International Conference on Learning Representations, modified Mar. 17, 2021, 21 pages.
Han, et al., "Transformer in Transformer," in arXiv e-prints, arXiv:2103.00112v3 [cs.CV], Oct. 26, 2021, 14 pages.
He, et al., "Deep Residual Learning for Image Recognition," in 2016 IEEE Conference on Computer Vision and Pattern Recognition (CVPR), 2016, pp. 770-778.
Jiang, et al., "All Tokens Matter: Token Labeling for Training Better Vision Transformers," in arXiv e-prints, arXiv:2104.10858v3 [cs.CV], Jun. 9, 2021, 16 pages.
Jiang, et al., "Token Labeling: Training an 85.4% Top-1 Accuracy Vision Transformer with 56M Parameters on ImageNet," in arXiv e-prints, arXiv:2104.10858v2 [cs.CV], Apr. 22, 2021, 10 pages.
Krizhevsky, Alex, "One weird trick for parallelizing convolutional neural networks," in arXiv e-prints, arXiv:1404.5997v2 [cs.NE], Apr. 26, 2014, 7 pages.
Liu, et al., "Swin Transformer: Hierarchical Vision Transformer using Shifted Windows," in arXiv e-prints, arXiv:2103.14030v2 [cs.CV], Aug. 17, 2021, 14 pages.
Pan, et al., "Scalable Vision Transformers with Hierarchical Pooling," in Proceedings of the 2021 International Conference on Computer Vision, Oct. 2021, pp. 377-386.
Radosavovic, et al., "Designing Network Design Spaces," in 2020 Conference on Computer Vision and Pattern Recognition, Jun. 2020, pp. pp 10428-10436.
Rao, et al., "DynamicViT: Efficient Vision Transformers with Dynamic Token Sparsification," available at https://proceedings.neurips.cc/paper/2021/hash/747d3443e319a22747fbb873e8b2f9f2-Abstract.html , in Advances in Neural Information Processing Systems 34 Pre-proceedings (NeurIPS 2021), Dec. 2021, 13 pages.
Rao, et al., "Global Filter Networks for Image Classification," available at https://papers.nips.cc/paper/2021/hash/07e87c2f4fc7f7c96116d8e2a92790f5-Abstract.html, in Advances in Neural Information Processing Systems 34 Pre-proceedings (NeurIPS 2021), Dec. 2021, 14 pages.
Simonyan, et al., "Very Deep Convolutional Networks for Large-Scale Image Recognition," in arXiv e-prints, arXiv:1409.1556v6 [cs.CV], Apr. 10, 2015, 14 pages.
Touvron, et al., "Training data-efficient image transformers & distillation through attention," in Proceedings of the 38th International Conference on Machine Learning, PMLR vol. 139, Jun. 2021, 11 pages.
Wang, et al., "Pyramid Vision Transformer: A Versatile Backbone for Dense Prediction without Convolutions," in arXiv e-prints, arXiv:2102.12122v2 [cs.CV], Aug. 11, 2021, 15 pages.
Wu, et al., "CvT: Introducing Convolutions to Vision Transformers," in Proceedings of the 2021 International Conference on Computer Vision, Oct. 2021, pp. 22-31.
Xu, et al., "Co-Scale Conv-Attentional Image Transformers," in arXiv e-prints, arXiv:2104.06399v2 [cs.CV], Aug. 26, 2021, 10 pages.
Yuan, et al., "Tokens-to-Token ViT: Training Vision Transformers from Scratch on ImageNet," in arXiv e-prints, arXiv:2101.11986v3 [cs.CV], Nov. 30, 2021, 10 pages.
Carion, "End-to-End Object Detection with Transformers," Proceedings of 16th European Conference on Computer Vision, ECCV 2020, Aug. 2020, 17 pages.
Cheng, et al., "Per-Pixel Classification is Not All You Need for Semantic Segmentation," in arXiv e-prints, arXiv:2107.06278v2 [cs.CV], Oct. 31, 2021, 17 pages.
Dosovitskiy, et al., "An Image is Worth 16×16 Words: Transformers for Image Recognition at Scale," in arXiv e-prints, arXiv:2010.11929v2 [cs.CV], Jun. 3, 2021, 22 pages.
Gong, et al., "Compressing Deep Convolutional Networks using Vector Quantization," in arXiv e-prints, arXiv:1412.6115v1 [cs.CV], Dec. 18, 2014, 10 pages.
Goyal, et al., "PoWER-BERT: Accelerating BERT Inference via Progressive Word-vector Elimination," in arXiv e-prints, arXiv:2001.08950v5 [cs.LG], Sep. 8, 2020, 11 pages.
Guo, et al., "Star-Transformer," arXiv:1902.09113v2 [cs.CL], Feb. 28, 2019, 11 pages.
He, et al., "Channel Pruning for Accelerating Very Deep Neural Networks," in 2017 IEEE International Conference on Computer Vision (ICCV), 2017, 9 pages.
Hinton, et al., "Distilling the Knowledge in a Neural Network," in arXiv e-prints, arXiv:1503.02531v1 [stat.ML], Mar. 9, 2015, 9 pages.
Howard, et al., "MobileNets: Efficient Convolutional Neural Networks for Mobile Vision Applications" in arXiv e-prints, arXiv:1704.04861v1 [cs.CV], Apr. 17, 2017, 9 pages.
Jaderberg, et al., "Speeding up Convolutional Neural Networks with Low Rank Expansions," in arXiv e-prints, arXiv:1405.3866v1 [cs.CV], May 15, 2014, 12 pages.
Zihang, et al., "All Tokens Matter: Token Labeling for Training Better Vision Transformers," in arXiv e-prints, arXiv:2104.10858v3 [cs.CV], Jun. 9, 2021, 16 pages.
Jiao, et al., "TinyBERT: Distilling BERT for Natural Language Understanding," in Findings of the Association for Computational Linguistics: EMNLP 2020, Nov. 2020, pp. 4163-4174.
Liu, et al., "MetaDistiller: Network Self-Boosting via Meta-Learned Top-Down Distillation," in arXiv e-prints, arXiv:2008.12094v1 [cs.CV], Aug. 27, 2020, 16 pages.
Liu, et al., "Swin Transformer: Hierarchical Vision Transformer using Shifted Windows," in Proceedings of the IEEE/CVF International Conference on Computer Vision (ICCV), 2021, pp. 10012-10022.

(56) References Cited

OTHER PUBLICATIONS

Rao, et al., "Runtime Network Routing for Efficient Image Classification," in IEEE Transactions on Pattern Analysis and Machine Intelligence, vol. 41, No. 10, Oct. 2019, 14 pages.

Rao, et al., "DynamicViT: Efficient Vision Transformers with Dynamic Token Sparsification," in arXiv e-prints, arXiv:2106.02034v2 [cs.CV], Oct. 26, 2021, 15 pages.

Rao, et al., "Global Filter Networks for Image Classification," in arXiv e-prints, arXiv:2107.00645v2 [cs.CV], Oct. 26, 2021, 19 pages.

Ryoo, et al., "TokenLearner: What Can 8 Learned Tokens Do for Images and Videos?" arXiv e-prints, arXiv:2106.11297v2 [cs.CV], Oct. 5, 2021, 21 pages.

Tan, et al., "EfficientNet: Rethinking Model Scaling for Convolutional Neural Networks," in Proceedings of the 36th International Conference on Machine Learning, PMLR 97, 2019, 10 pages.

Touvron, et al., "Training data-efficient image transformers & distillation through attention," in arXiv e-prints, arXiv:2012.12877v2 [cs.CV], Jun. 15, 2021, 22 pages.

Vaswani, et al., "Attention Is All You Need," in 31st Conference on Neural Information Processing Systems (NIPS 2017), 2017, 11 pages.

Wang, et al., "HAQ: Hardware-Aware Automated Quantization With Mixed Precision," in 2019 IEEE/CVF Conference on Computer Vision and Pattern Recognition (CVPR), 2019, 9 pages.

Wu, et al., "CvT: Introducing Convolutions to Vision Transformers," in arXiv e-print, arXiv:2103.15808v1 [cs.CV], Mar. 29, 2021, 10 pages.

Yu, et al., "On Compressing Deep Models by Low Rank and Sparse Decomposition," 2017 IEEE Conference on Computer Vision and Pattern Recognition (CVPR), 2017, 10 pages.

Yu, et al., "PoinTr: Diverse Point Cloud Completion With Geometry-Aware Transformers," in Proceedings of the IEEE/CVF International Conference on Computer Vision (ICCV), Oct. 2021, pp. 12498-12507.

Zhao, et al., "Point Transformer," in Proceedings of the IEEE/CVF International Conference on Computer Vision (ICCV), Oct. 2021, pp. 16259-16268.

Zheng, et al., "Rethinking Semantic Segmentation from a Sequence-to-Sequence Perspective with Transformers," in Proceedings of the IEEE/CVF International Conference on Computer Vision (ICCV), Oct. 2021, pp. 6881-6890.

Zhao, et al., "DeepViT: Towards Deeper Vision Transformer," in arXiv e-prints, arXiv:2103.11886v2 [cs.CV], Mar. 23, 2021, 10 pages.

Devlin, et al., "BERT: Pre-training of Deep Bidirectional Transformers for Language Understanding," in arXiv e-prints, arXiv:1810.04805v2 [cs.CL], May 24, 2019, 16 pages.

Milletari, et al., "V-Net: Fully Convolutional Neural Networks for Volumetric Medical Image Segmentation," in 2016 Fourth International Conference on 3D Vision (3DV), 2016, pp. 565-571.

Davuluri, Pavan, "Microsoft Ignite 2024: Embracing the future of Windows at work,", available at https://blogs.windows.com/windowsexperience/2024/11/19/microsoft-ignite-2024-embracing-the-future-of-windows-at-work/, Windows Blog, Nov. 19, 2024, 20 pages.

Tsang, Sik-Ho, "Brief Review—nnU-Net: A Self-Configuring Method for Deep Learning-based Biomedical Image Segmentation," available at https://sh-tsang.medium.com/brief-review-nnu-net-a-self-configuring-method-for-deep-learning-biomedical-image-97fed4b2079, in Medium, Feb. 16, 2023, 12 pages.

"Big Bird: Transformers for Longer Sequences," available at https://github.com/google-research/bigbird, Github, accessed on Mar. 21, 2025, 6 pages.

Peters, et al., "Sparse Sequence-to-Sequence Models," arXiv, arXiv:1905.05702v2 [cs.CL], Jun. 12, 2019, 17 pages.

Antonelli, et al., "The Medical Segmentation Decathlon," in Nature Communications, 2022, 13 pages.

Ryali, et al., "Hiera: A Hierarchical Vision Transformer without the Bells-and-Whistles," in Proceedings of the 40th International Conference on Machine Learning, PMLR 202, 2023, 14 pages.

Armato, et al., "The Lung Image Database Consortium (LIDC) and Image Database Resource Initiative (IDRI): A Completed Reference Database of Lung Nodules on CT Scans," Med. Phys. 38(2), Feb. 2011, pp. 915-931.

Kirillov, et al., "Segment Anything," in 2023 IEEE/CVF International Conference on Computer Vision (ICCV), Feb. 2023, 12 pages.

Ji, et al., "AMOS: A Large-Scale Abdominal Multi-Organ Benchmark for Versatile Medical Image Segmentation," in 36th Conference on Neural Information Processing Systems (NeurIPS 2022) Track on Datasets and Benchmarks, 2022, 11 pages.

He, et al., "Masked Autoencoders Are Scalable Vision Learnerrs," in 2022 IEEE/CVF Conference on Computer Vision and Pattern Recognition (CVPR), 2022, 10 pages.

Yang, et al, "Unified Contrastive Learning in Image-Text-Label Space," in 2022 IEEE/CVF Conference on Computer Vision and Pattern Recognition (CVPR), 2022, 11 pages.

Cheng, et al., "Masked-attention Mask Transformer for Universal Image Segmentation," in 2022 IEEE/CVF Conferernce on Computer Vision and Pattern Recognition (CVPR), 2022, 10 pages.

Yang, et al., "Focal Modulation Networks," in 36th Conference o Neural Information Processing System (NeurIPS 2022), 2022, 15 pages.

Zou, et al., "Generalized Decoding for Pixel, Image, and Language," in 2023 IEEE/CVF Conference on Computer Vision and Pattern Recognition (CVPR), 2023, 12 pages.

Zou, et al., "Segment Everything Everywhere All at Once," in 37th Conference on Neural Information Processing Systems (NeurIPS 2023), 2024, 14 pages.

Zaheer, et al., "Big Bird: Transformers for Longer Sequences," arXiv, arXiv:2007.14062v2 [cs.LG], Jan. 8, 2021, 42 pages.

Isensee, et al., "nnU-Net: Self-adapting Framework for U-Net-Based Medical Image Segmentation," arXiv, arXiv:1809.10486v1 [cs.CV], Sep. 27, 2018, 11 pages.

Zhao, et al., "BiomedParse: a biomedical foundation model for image parsing of everything everywhere all at once," arXiv, arXiv:2405.12971v3 [cs.CV], Jun. 4, 2024, 26 pages.

Zhao, et al., "Boltzmann Attention Sampling for Image Analysis with Small Objects," arXiv, arXiv:2503.02841v1 [cs.CV], Mar. 4, 2025, 15 pages.

Bolya, et al., "Window Attention is Bugged: How not to Interpolate Position Embeddings," arXiv, arXiv:2311.05613v1 [cs.CV], Nov. 9, 2023, 17 pages.

Ravi, et al., "SAM 2: Segment Anything in Images and Videos," arXiv, arXiv:2408.000714v2 [cs.CV], Oct. 28, 2024, 42 pages.

Isensee, et al., "nnU-Net: a self-configuring method for deep learning-based biomedical image segmentation," in Nature Methods, vol. 18, Feb. 2021, 14 pages.

* cited by examiner

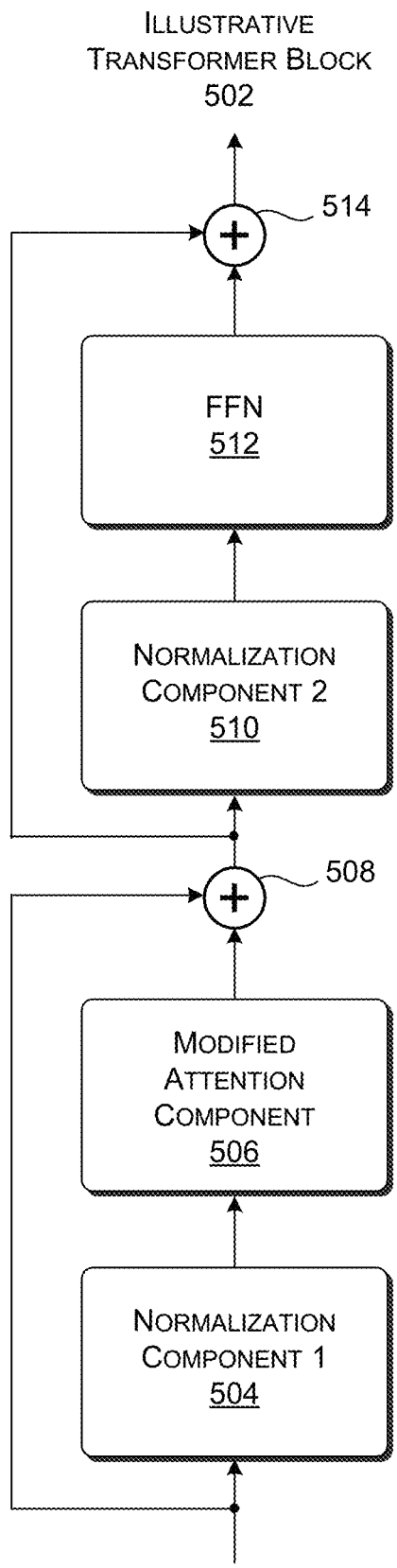
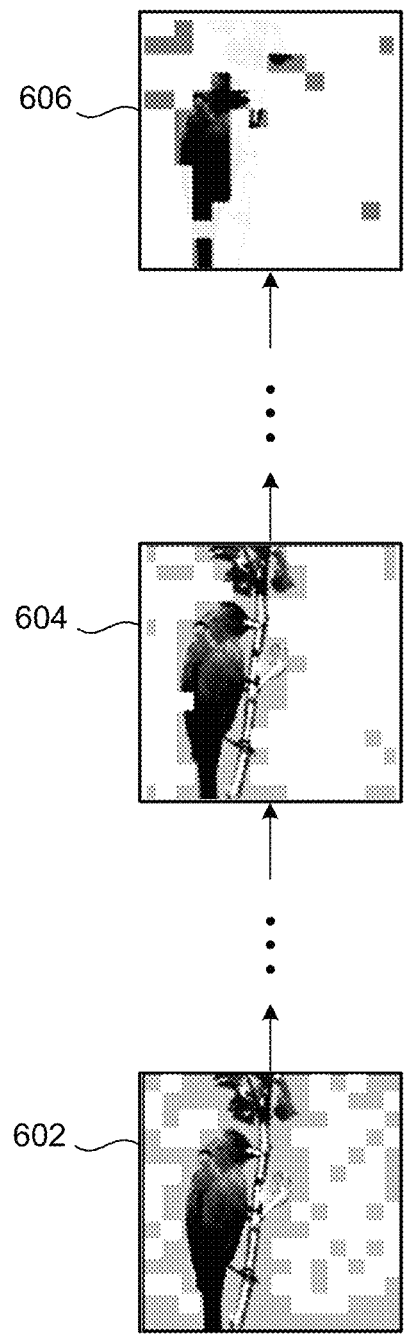
FIG. 5
FIG. 6

OVERVIEW OF OPERATION OF THE PRE-PROCESSING SYSTEM, 802

OBTAIN PLURAL ITEM TOKENS THAT REPRESENT A DATA ITEM (E.G., AN IMAGE).
804

OBTAIN A CLASSIFICATION TOKEN.
806

CONVERT THE ITEM TOKENS AND THE CLASSIFICATION TOKEN INTO EMBEDDING VECTORS.
808

FIG. 8

OVERVIEW OF OPERATION OF THE TRANSFORMER SYSTEM, 902

RECEIVE EMBEDDING VECTORS THAT REPRESENT A PLURALITY OF ITEM TOKENS GENERATED BASED ON A DATA ITEM, AND A CLASSIFICATION TOKEN.
904

GENERATE ORIGINAL ATTENTION INFORMATION BASED ON THE EMBEDDING VECTORS, THE ORIGINAL ATTENTION INFORMATION HAVING A PLURALITY OF ATTENTION VALUES, EACH ATTENTION VALUE DESCRIBING AN IMPORTANCE THAT A PARTICULAR TOKEN PLAYS IN AN INTERPRETATION OF ANOTHER PARTICULAR TOKEN.
906

GENERATE SCORE INFORMATION BASED ON ATTENTION VALUES IN THE ORIGINAL ATTENTION INFORMATION THAT PERTAIN TO THE CLASSIFICATION TOKEN.
908

OVERVIEW OF OPERATION OF THE TRANSFORMER SYSTEM (CONTINUED), 902

CONTINUED FROM FIG. 9

GENERATE MODIFIED ATTENTION INFORMATION BY REMOVING ATTENTION VALUES FROM THE ORIGINAL ATTENTION INFORMATION BASED ON THE SCORE INFORMATION.
1002

PERFORM SUBSEQUENT OPERATIONS IN THE TRANSFORMER NEURAL NETWORK, AS GUIDED BY A SAMPLING OPERATION THAT IS PERFORMED BASED ON THE SCORE INFORMATION, TO PRODUCE TRANSFORMER OUTPUT INFORMATION, THE SUBSEQUENT OPERATIONS PERFORMING FEWER OPERATIONS BY USING THE MODIFIED ATTENTION INFORMATION RATHER THAN THE ORIGINAL ATTENTION INFORMATION.
1004

CLASSIFY CONTENT IN THE DATA ITEM BASED ON THE TRANSFORMER OUTPUT INFORMATION.
1006

FIG. 10

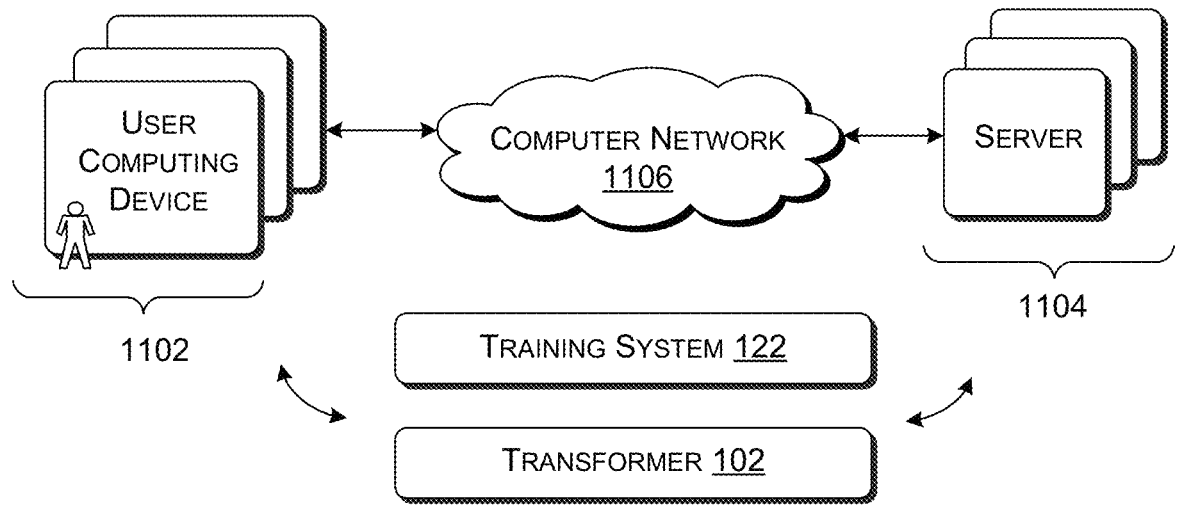

FIG. 11

ADAPTIVE TOKEN SAMPLING FOR EFFICIENT TRANSFORMER

BACKGROUND

Transformer-based technology was originally developed for use in various Natural Language Processing (NLP) applications. This type of technology is characterized by the use of attention mechanisms to process input tokens. When processing a particular word under consideration, for instance, an attention mechanism can determine how much importance or focus should be placed on each of the other words in an input sentence. For example, when processing the word "it" that appears in a sentence, the attention mechanism may conclude that attention should be paid to another word in the sentence to which "it" presumably refers.

A developer faces technical challenges in extending transformer-based technology to other non-NLP fields, such as the image-processing domain. First, transformer-based operations are "expensive" in that they are highly data-intensive in nature. Second, some data items, such as images, are more complex than text-based tokens. In view of these factors, some computing platforms may lack sufficient resources to successfully apply transformer-based technology in many contexts.

SUMMARY

A transformer is described herein for using transformer-based technology to process data items, such as, but not limited to, images. The transformer increases the efficiency of the transformer-based technology by using a modified attention component. In operation, the modified attention component accepts embedding vectors that represent a plurality of item tokens, together with a classification token. A first stage of the modified attention component generates original attention information based on the embedding vectors. The original attention information has a plurality of attention values, each of which describes an importance that a particular token plays in the interpretation of another particular token. A second stage generates score information based on a portion of the original attention information that pertains to the classification token. A third stage produces modified attention information by removing attention values from the original attention information, as guided by a sampling operation that is performed based on the score information.

Ultimately, the transformer generates transformer output information. In some implementations, a post-processing component classifies the content of the data item based on the transformer output information.

According to one advantage, operations performed by the transformer on the modified attention information can take place more efficiently compared to operations that would otherwise be performed on the original attention information. This is because the operations performed on the modified attention information are less data-intensive compared to operations that would otherwise be performed on the original attention information. This characteristic, in turn, enables some computing devices having limited computing capabilities to the run the transformer, whereas they would otherwise have been precluded.

According to additional illustrative aspects, the transformer can include plural instances of the modified attention component operating at different respective stages of the transformer.

According to additional illustrative aspects, the above-summarized scoring and sampling functions of the modified attention component are parameter-less, meaning that they are not based on the use of their own machine-trained weights. This further means that a developer can add the scoring and sampling functions to a preexisting transformer that has already been trained, without regard to the architecture of the preexisting transformer. The weights of the modified transformer thus produced can be fine-tuned, although it is not necessary to do so. This characteristic expedites the deployment of the above-summarized technology and broadens its use cases.

The above-summarized technology can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 5 shows an encoder block for use in the transformer of FIG. 1. The encoder block includes the modified encoder of FIG. 2.

FIG. 6 shows an example of the operation of the transformer of FIG. 1.

FIG. 8 shows illustrative operations performed by a pre-processing system of the transformer of FIG. 1.

FIGS. 9 and 10 together show illustrative operations performed by a transformer neural network of the transformer of FIG. 1.

FIG. 11 shows computing equipment that can be used to implement the computing systems shown in FIG. 1

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a transformer that uses transformer-based technology to process data items. Section B sets forth illustrative methods that explain the operation of the transformer of Section A. And Section C describes illustrative computing functionality that can be used to implement any aspect of the features described in Sections A and B.

A. Illustrative Transformer and Method of Training

Figure 1:
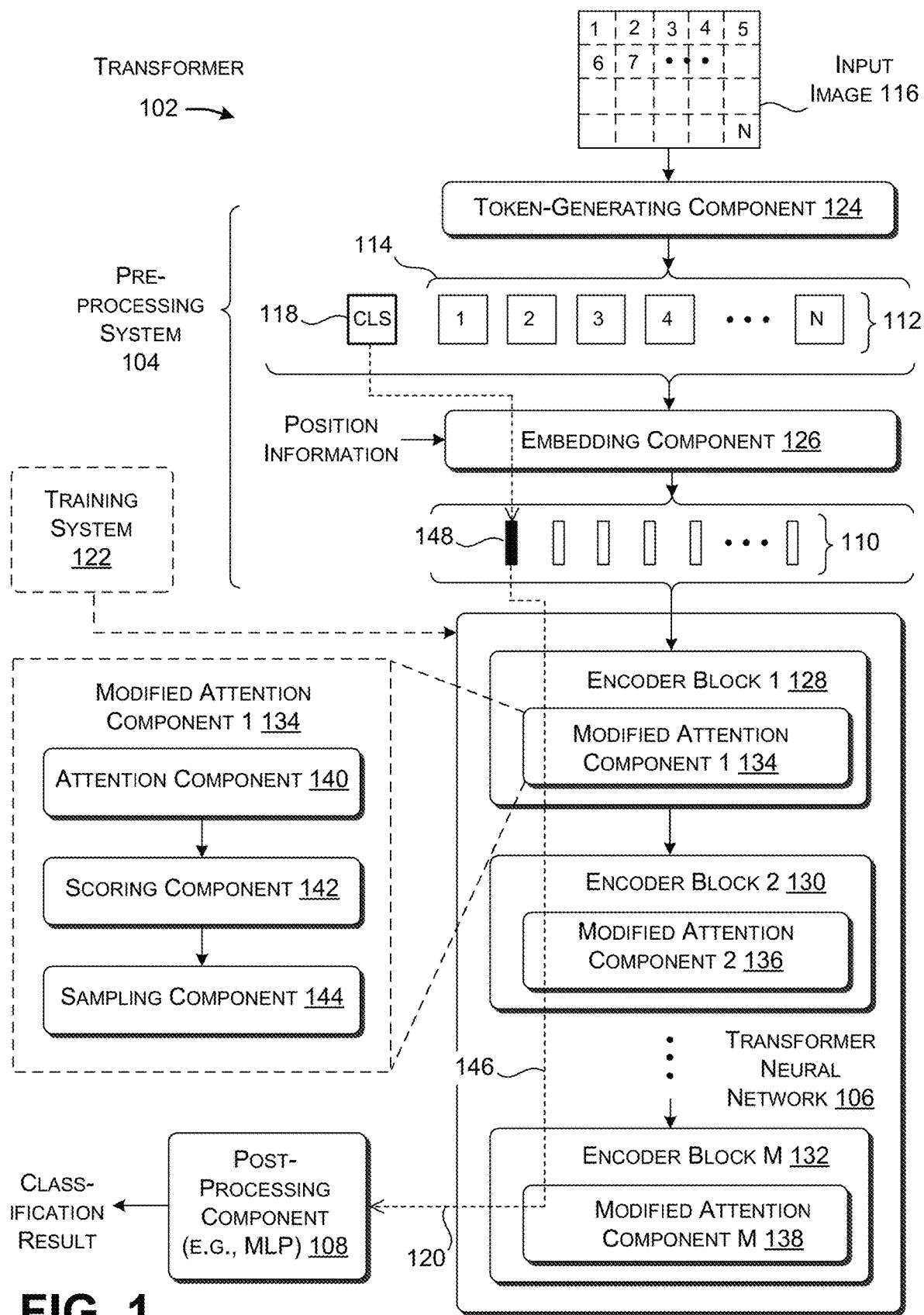
FIG. 1 shows an illustrative transformer that uses at least one modified attention component.

FIG. 1 shows an illustrative transformer 102 that uses at least one modified attention component. In the most general case, the transformer 102 can be applied to expedite the processing of any data items, such as images, video, audio, graphics, model data, instances of text, markup language content, and so on, or any combination thereof. However, to facilitate explanation, the transformer 102 will be described below principally in the context of processing images. In that context, the transformer 102 may be referred to as a vision transformer. Note that any principle described below in the context of image-processing is more generally applicable to the processing of any data items. Further, any mention of a "vision transformer" below applies more generally to any "transformer."

The transformer 102 (henceforth "vision transformer" 102) includes a pre-processing system 104, a transformer neural network 106, and a post-processing component 108. The pre-processing system 104 generates embedding vectors 110 for input to the transformer neural network 106. The embedding vectors 110 describe different tokens 112, including: a plurality of image tokens 114 drawn from an input image 116, together with a classification (CLS) token 118. The transformer neural network 106 uses plural encoding blocks to convert the embedding vectors 110 into transformer output information 120. The post-processing component 108 maps the transformer output information 120 into an output result. For example, the post-processing component 108 may classify content that appears in the input image 116 based on the transformer output information 120. A training system 122 trains one or more machine-trained models used by the vision transformer 102.

Beginning with an explanation of the pre-processing system 104, a token-generating component 124 produces the plurality of image tokens 114 that represent the input image 116. In some implementations, the token-generating component 124 performs this task by slicing the input image 116 into a plurality of smaller images. FIG. 1 shows dashed lines intersecting the input image 116 to illustrate this slicing operation. However, in actual practice, the token-generating component 124 can divide the input image 116 into smaller parts than is illustrated in FIG. 1. Alternatively, or in addition, the token-generating component 124 can use a convolutional neural network (CNN) (not shown) to transform the input image 116 into one or more feature maps. The token-generating component 124 can then slice the feature map(s) into smaller maps. These examples are set forth in the spirit of illustration, not limitation. Generally, the image tokens 114 produced by the token-generating component 124 represent any respective parts of the input image 116, and/or respective parts of information that are derived on the basis of the input image 116.

The token-generating component 124 can perform other types of partitioning when applied to other data items (besides images). For example, the token-generating component 124 can divide a stream of audio data into temporally-consecutive audio snippets.

An embedding component 126 converts the image tokens 114 into the embedding vectors. The embedding component 126 can perform this task by flattening each image token. The embedding component 126 can flatten an image token by concatenating its separate rows or columns, to produce a single token vector. The embedding component 126 can then use any type of transformation function to convert the token vector into an embedding vector. For example, the embedding component 126 can use a machine-trained neural network, a lookup table, a hashing function, etc. to perform this function. The embedding component 126 can convert the CLS token 118 into an encoding vector by using a lookup table to identify a token vector associated with the CLS token, and then using any of the above-identified kinds of transformations to convert the token vector into an embedding vector.

The embedding component 126 can also incorporate position information into each embedding vector. The position information describes a position of each input token in a sequence of input tokens. For example, the embedding component 126 can rely on a predetermined ordering rule to assign indices to each of the image tokens 114. For each of the image tokens, the embedding component 126 can then combine vector information describing its position with the embedding vector, to produce a position-modified embedding vector. In some implementations, the embedding component 126 can assign a position 0 to the CLS token 118.

The transformer neural network 106 uses a processing pipeline that includes one or more encoder blocks (128, 130, ..., 132) to transform the embedding vectors 110 into the transformer output information 120. For example, without limitation, the processing pipeline can include twelve encoder blocks. The first encoder block 128 operates on the embedding vectors 110 to produce first-stage hidden state information. The second encoder block 130 maps the hidden state information produced by the first encoder block 128 into second-stage hidden state information, and so. The transformer output information 120 represents the hidden state information produced by the last encoder block 132.

Note that the hidden state information produced by each encoder block maintains its association with particular input tokens 112. For example, part of the hidden state information produced by the first encoder block 128 is associated with the first input token, another part of the hidden state information is associated with the second input token, and so on. But each encoder block otherwise applies the same machine-trained model to all of the input tokens.

At least one of the encoder blocks (128, 130, ..., 132) includes a modified attention component. For example, FIG. 1 shows that all of the encoder blocks (128, 130, ..., 132) include respective modified attention components (134, 136, ..., 138). Other implementations can intersperse modified attention components among non-modified attention components in any manner to accommodate any application-specific objectives. For instance, other implementations can predominantly use the modified attention components in later stages of the image processing pipeline, e.g., by using the modified attention components in the last eight encoder blocks of a twelve-block processing pipeline. Addition details regarding each encoder block will be set forth below in connection with the explanation of FIG. 5.

FIG. 1 provides a high-level overview of the first modified attention component 134. The modified attention component 134 includes an attention component 140 that transforms input information (described below) into original attention information. A scoring component 142 produces score information based on the original attention information. The score information includes scores assigned to the image tokens 114. A sampling component 144 produces modified attention information, as guided by a sampling operation that is performed based on the score information. The modified attention information differs from the original attention information by eliminating at least some attention values that are included in the original attention information.

The operation of the modified attention component 134 will be set forth below in greater detail in connection with the explanation of FIG. 2.

The encoder blocks (130, . . . , 132) which follow the modified attention component 134 in the pipeline directly or indirectly process the modified attention information, rather than the original attention information. The operations performed by these encoder blocks (130, . . . , 132) are made less computationally intensive by virtue of the fact that the modified attention information is smaller than the original attention information. Overall, this provision reduces the amount of work that the vision transformer 102 needs to perform to process the input image 116. Correspondingly, the use of the modified attention component(s) reduces the amount of computing resources consumed by the vision transformer 102 in processing the input image 116.

FIG. 1 illustrates a path 146 of processing operations performed on an embedding vector 148 associated with the CLS token 118. The transformer output information 120 represents hidden state information produced for the CLS token by the last encoder block 132. The post-processing component 108 can use any type of feed-forward network to map the transformer output information 120 into intermediate output information. The post-processing component 108 can then use a softmax operation (e.g., a normalized exponential function) to map the intermediate output information into a probability distribution. The probability distribution identifies the likelihood that content in the image 116 corresponds to each of a plurality of possible image classes. The post-processing component 108 can use an argmax operation to output the classification having the highest likelihood.

In other implementations, the post-processing component 108 can perform other operations. For example, alternatively, or in addition, the post-processing operation 108 can detect the location of an object in the input image 116. Alternatively, or in addition, the post-processing operation 108 can enhance the input image 116. Alternatively, or in addition, the post-processing component 108 can introduce new content to the image 116, and so on.

Figure 2:
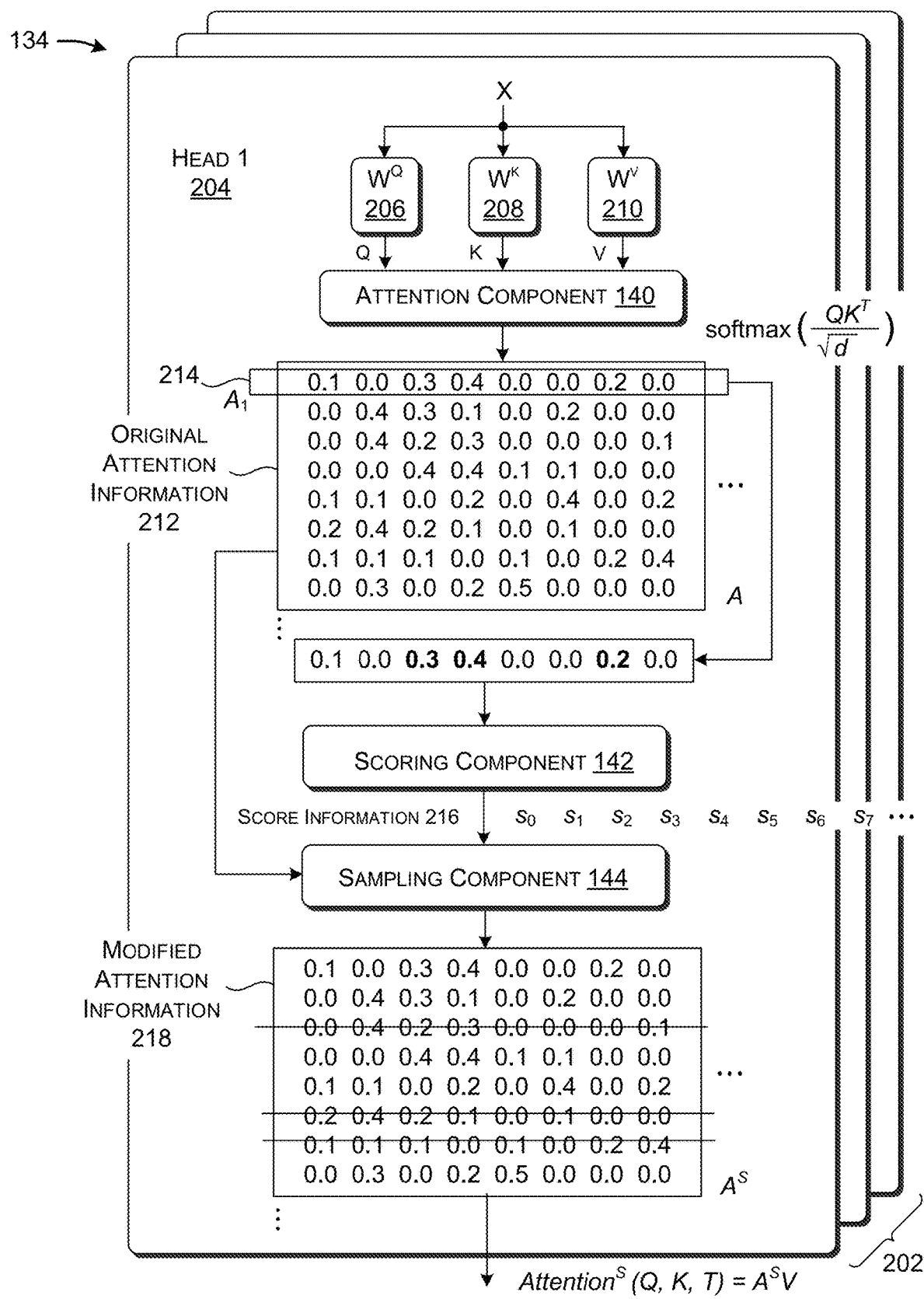
FIG. 2 shows an illustrative modified attention component for use in the transformer of FIG. 1.

FIG. 2 shows further details of the representative modified attention component 134 introduced in FIG. 1. In one case, the modified attention component 134 includes plural heads 202. Each head processes input information fed to it with respect to a particular vector sub-space. As a result of this operation, the different heads 202 can provide different insight regarding the input information fed to the modified attention component 134. The modified attention component 134 can produce its final attention information by summing together the attention information produced by its plural heads 202. However, to facilitate explanation, the following description will be provided for only a representative head 204. A head-specific and level-specific set of machine-trained weights governs the operation of the representative head 204.

The modified attention component 134 receives input information X. Since the modified attention component 134 is part of the first encoder block 128, the input information X represents the embedding vectors 110 provided to the transformer neural network 106, e.g., combined together in a single matrix. (If the modified attention component 134 was a later-stage component in the image-processing pipeline, then the input information X would represent the output of a preceding encoder block.) The modified attention component 134 uses three different linear transformers (206, 208, 210) to respectively produce query information (Q), key information (K), and value information (V). More specifically, the linear transformer 206 produces the query information Q by multiplying the input matrix X by a first machine-trained weighting matrix $W^Q$. The linear transformer 208 produces the key information K by multiplying the same input matrix X by a second machine-trained weighting matrix $W^K$. The linear transformer 210 produces the value information V by multiplying the same input matrix X by a third machined weight matrix $W^V$ The attention component 140 computes the original attention information 212 by performing self-attention, given by the following equation:

$$\text{attention information} = \text{softmax}\left(\frac{QK^T}{\sqrt{d}}\right). \tag{1}$$

Equation (1) involves taking the dot product of Q by the transpose of K, and then dividing that dot product by a scaling factor $\sqrt{d}$, where d may represent the dimensionality of the machine-learned model. This yields a scaled result. Equation (1) then involves computing the softmax of the scaled result, which yields an attention matrix A (the original attention information 212 shown in FIG. 1). Without the modification described herein, a final attention result would be produced by multiplying the attention matrix A by the value information V, e.g., attention (Q, K, T)=AV. Background information regarding Equation (1) is provided in the seminal paper by VASWANI, et al., "Attention Is All You Need," in 31st Conference on Neural Information Processing Systems (NIPS 2017), 2017, 11 pages.

The original attention information 212 includes a plurality of rows of attention values. Each row is associated with a particular input token. For example, the first row 214 ($A_1$) of the original attention information 212 pertains to the CLS token 118. The second row of the original attention information 212 pertains to the first image token, and so on. Each attention value describes how much the interpretation of a particular input token under consideration depends on another input token. For example, a third attribute value in the first row 214 describes how much the interpretation of the CLS token depends on a particular image token.

The scoring component 142 scores each image token with respect to its importance in generating an accurate image classification. In one implementation, the scoring component 142 scores each particular image token j by multiplying the attribute value corresponding to the particular image token j in the first row 214 of the original attention information 212 by the value information associated with this image token. That is, $$s_j = A_{1,j} \times \|V_j\| \tag{2}.$$

In Equation (2), $A_{1,j}$ represents the attention value associated with the image token j under consideration in the first row 214 of the original attention information 212. $\|V_j\|$ represents the Euclidean norm (e.g., L2 norm) of the entry in the value information V associated with the token j under consideration. $s_j$ represents the score assigned to the image token j under consideration. The term "score information" is used herein to collectively refer to the scores produced by Equation (2). Note that Equation (2) is set forth here in the spirit of illustration, not limitation; other implementations can express the usefulness of the image token j to the classification task in different ways.

The sampling component 144 produces modified attention information 218 based on the score information 216 produced by the scoring component 142. From a high-level perspective, the sampling component 144 treats the score information as a probability distribution. Guided by that distribution, it picks rows of attribute values in the original attention information 212 that should be retained. Implicitly, the sampling component 144 also chooses which rows of the attribute values should be omitted (if any) in the modified attention information 218. As previously stated, rows in the original attention information are associated with respective image tokens. Thus, the sampling component 144 can be said to choose which image tokens are allowed to contribute to the task of classifying the image 116, and which image tokens are not. One implementation of the sampling component 144 will be set forth below in connection with FIG. 4.

The sampling component 144 can remove rows of attention values in different ways. For example, the sampling component 144 can collapse the original attention information 212 to account for the removal of rows. Alternatively, the sampling component 144 can mask each row of attention values by changing the values in the row to zero. The inference-stage manifestation of the vision transformer 102 can use the first removal option, while a batch-driven training-stage manifestation of the vision transformer 102 can use the second removal option.

Note that the removal (or effective removal) of a row of attention values does not entirely remove the influence of an associated image token in the final classification operation. For example, each row that is retained in the modified attention information 218, which is associated with a retained image token, still describes an extent to which the image token that has been removed is important to the retained image token's own interpretation. In this sense, the sampling component 144 can be said to "softly" downsample within the pipeline of image-processing operations. The sampling component 144 does not erase the memory of the existence of image tokens that have been removed, as their influence remains in the modified attention information 218.

The sampling component 144 yields a modified attention matrix $A^S$, which corresponds to the modified attention information 218 shown in FIG. 2. The modified attention component 134 produces its final output result by multiplying the modified attention matrix $A^S$ by the value information V, e.g., Attention$^S$(Q, K, T)=$A^S$V.

Figure 3:
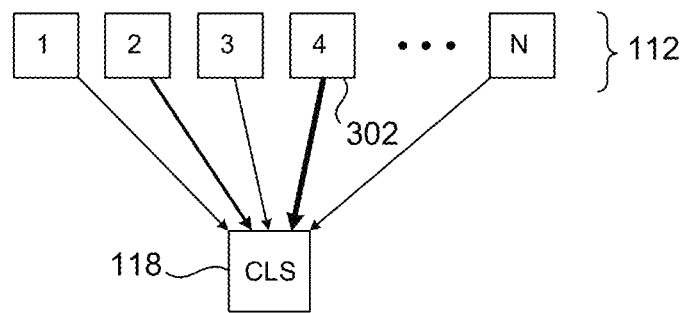
FIG. 3 illustrates a principle by which the modified attention component of FIG. 1 generates score information.

FIG. 3 illustrates the significance of the attribute values in the first row 214 of the original attention information 212. The attribute values reflect the importance of each image token in the interpretation of the classification token 118. FIG. 3 depicts different illustrative degrees of focus using arrows having different thicknesses. The arrow that points from the fourth image token 302 to the CLS token has the thickest arrow. This means that the fourth image toke 302 has the greatest importance to the proper interpretation of what is being depicted in the image 116, which will be encoded in the transformer output information 120 fed to the post-processing component 108.

Figure 4:
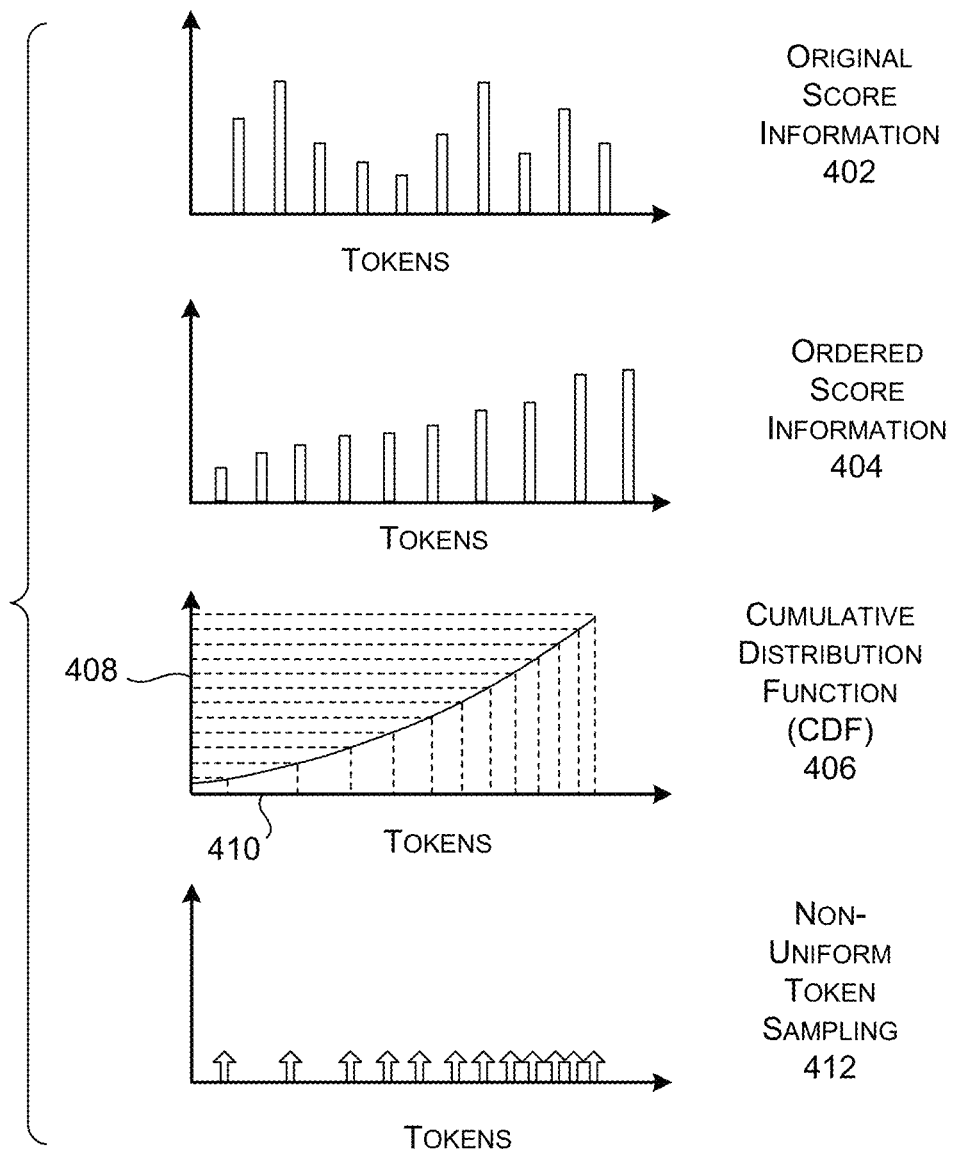
FIG. 4 shows one technique by which the modified attention component performs a sampling operation.

FIG. 4 shows one manner of operation of the sampling component 144. In a first stage, assume that the sampling component 144 receives the original score information 402 produced by the scoring component 142, e.g., which reflects individual scores assigned by the scoring component 142 to the image tokens using Equation (2). In a second stage, the sampling component 144 ranks the scores from smallest to largest. This yields sorted score information 404.

In a third stage, the sampling component 144 generates a cumulative distribution function (CDF) 406 based on the sorted scores. In some non-limiting implementations, the sampling component 144 can generate the CDF 406 based on the following equation:

$$C(i) = \sum_{j=0}^{j=i} S(j). \quad (3)$$

In this equation, S(j) represents a score associated with an image token j in the sorted score information 404. C(.) is the CDF 406 of the sorted score information 404. Equation (3) specifies that the value C(i) for any index value i in the CDF 406 is computed by summing the scores in the sorted score information 404, up to i=j. The sampling component 144 can also produce a sampling function by forming the inverse of the CDF function C(.), that is, by forming $C^{-1}(.)$.

In the fourth stage, the sampling component 144 samples among the image tokens 114 based on the CDF 406. Referring to the depiction of the CDF 406 in FIG. 4, the sampling component 144 can perform this function by uniformly picking points along the y axis of the CDF 406, e.g., by picking K points at regular intervals along the y axis 408 of the CDF 406. The sampling component 144 consults the curve of the CDF 406 to identify a token index value (along the x axis 410) that is associated with each chosen point along the y axis 408. The sampling component 144 treats the subset of image tokens identified in this manner as selected image tokens. The sampling component 144 treats the remainder of the image tokens as non-selected image tokens. In a fourth stage, the sampling component 144 can then remove the attribute values of the non-selected image tokens in the manner explained above in connection with FIG. 2.

The sampling strategy described above has the following characteristics. First, in some implementations, the sampling component 144 is configured to choose a maximum number K of image tokens, for which attention values will be retained in the modified attention information 218. In many implementations, the maximum number K is less than the total number N of image tokens 114 originally under consideration. Further note that the sampling operation performed by the sampling component 144 does not necessarily result in the identification of a new image token each time it is invoked. In some cases, two or more points selected along the y axis 408 resolve to the same token index value along the x axis 410. In this situation, the sampling component 144 will only choose a single image token. As a final result, the sampling strategy chooses K' image tokens, where K'≤K. FIG. 4 shows a plot 412 that represents the indices of the K' image tokens identified by the sampling operation performed by the sampling component 144. Stated in another way, the sampling component 144 dynamically and adaptively selects a variable number of tokens based on the characteristics of the image 116 under consideration, and the predetermined upper-bound value K.

Second, note that the sampling component 144 performs uniform sampling along the y axis 408 of the CDF 406. But this has the end effect of non-uniformly selecting indices along the x axis 410, meaning that the points selected along the x axis are separated by non-uniform distances. In general, the sampling strategy that guides the sampling component 144 is a form of inverse transform sampling.

Third, note that the above sampling strategy promotes the selection of image tokens having high scores. But the sampling component 144 also chooses from among image tokens having lower scores, with a reduced likelihood compared to the image tokens with higher scores. This characteristic is useful because it retains information that may prove important at a later stage in the image-processing pipeline, but, at the current stage, is discounted as having low value due to the influence of noise, etc.

Finally, note that other implementations of the sampling component 144 can perform sampling in other ways compared to that set forth above. For example, other implementations can choose the image tokens having the top K scores, without performing inverse transform sampling with respect to a probability distribution. Other implementations can use other algorithms for picking samples as guided by a probability distribution.

FIG. 5 shows one non-limiting implementation of an encoding block 502. Each of the encoding blocks (128, 130, . . . , 132) can adopt the block architecture shown in FIG. 5. The encoder block includes a pipeline of processing components including a first normalization component 504, a modified attention component 506, a first residual connection 508, a second normalization component 510, a feed-forward network (FNN) 512, and a second residual connection 514.

Each normalization component performs normalization of values in input information in different application-specific ways, e.g., by adjusting values in a layer based on the mean and standard deviation of those values in the layer. Each residual connection combines (e.g., sums) input information x fed into a specified function g(x) with output information produced by the specified function g(x). In other words, a residual connection performs the combination x+g(x). The FNN 512 can use any number of layers of neurons to transform input information into output information. For example, the FNN 512 may represent a fully-connected multi-layered perceptron (MLP).

Other implementations can vary the encoder bock architecture shown in FIG. 5 in any way(s). Further note that each encoder block need not include a modified attention component. That is, other encoder blocks can perform the attention operation of the attention component 140 (of FIG. 2), but not the functions of the scoring component 142 and the sampling component 144.

FIG. 6 describes the operation of the vision transformer 102 at three respective stages along the pipeline of image-processing operations performed by the transformer neural network 106. More specifically, each encoder block of the transformer neural network 106 produces hidden state information. FIG. 6 provides a visual representation of the hidden state information at the three respective stages. In each image shown in FIG. 6, a white region represents one or more original image tokens that have been removed through the operation of one or more modified attention components. More specifically, the vision transformer 102 does not remove the image tokens per se; rather, it removes the attention values associated with those image tokens.

More specifically, assume that the goal of the classification is to recognize the most prominent object in the input image, which is a bird. At a first stage, a first image 602 shows that one or more modified attention components have removed image tokens that principally show the background of the image. At a second stage, a second image 604 shows that one or more modified attention components have removed additional parts of the background. At a third stage, a third image 606 shows that the one or more modified attention components have removed even some portions of the bird that are considered non-essential to classifying the bird, and/or are redundant. The modified attention component(s) have also removed a portion of foliage that has been assessed as less important than the bird. In summary, the vision transformer's strategy of selectively removing less important parts of image content expedites the processing of the input image without markedly harming the accuracy at which the principal object in the image is classified.

Figure 7:
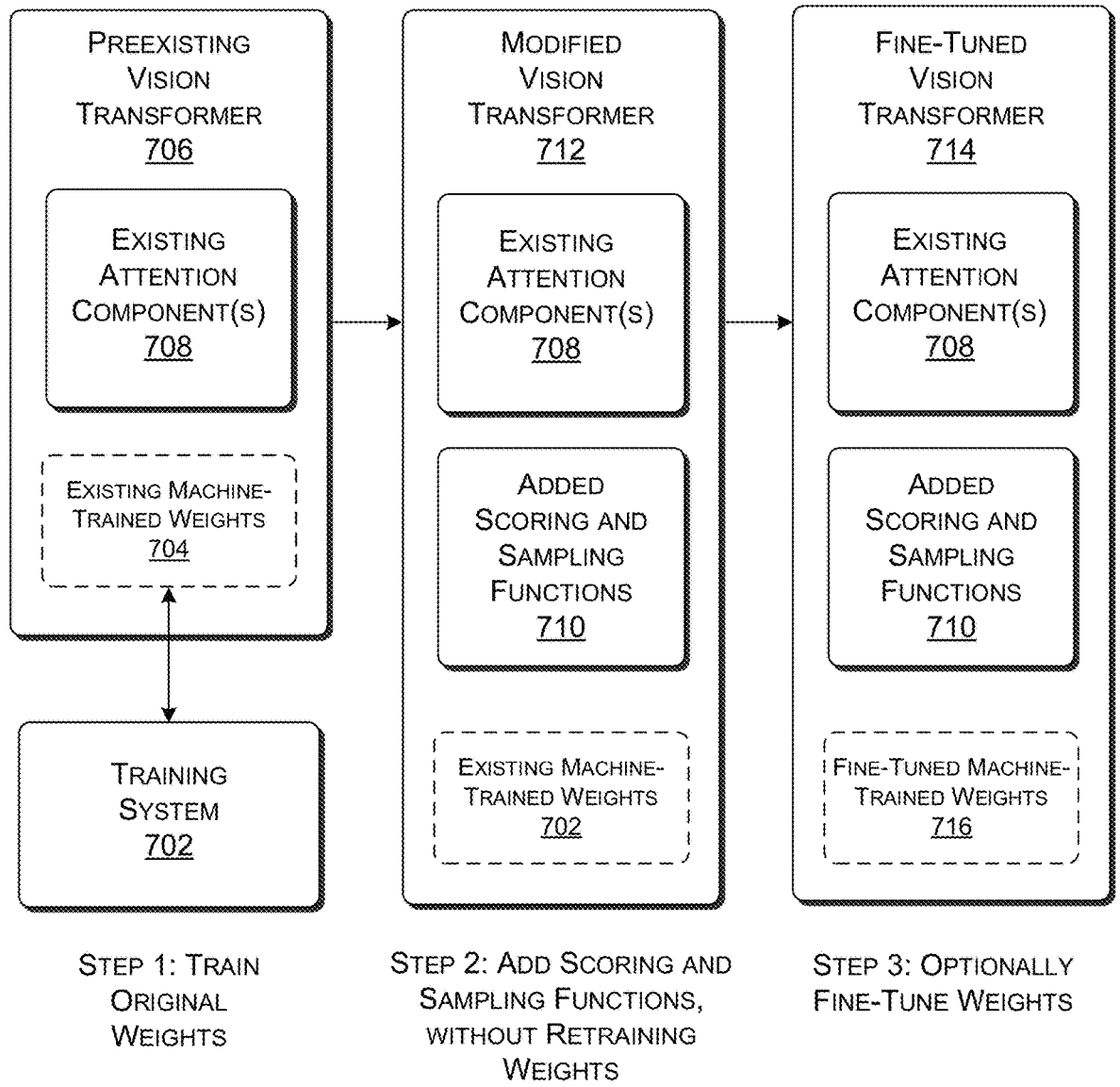
FIG. 7 shows one technique by which a training system can introduce scoring and sampling functions into a preexisting transformer.

FIG. 7 shows one technique for deploying a vision transformer having one or more modified attention components. In a first phase, assume that a training system 702 trains the weights 704 of any existing vision transformer 706 having any type of attention component(s) 708 and any transformer architecture. In a second stage, a developer adds the scoring and sampling functions 710 set forth in connection with FIG. 2 to the existing vision transformer 706, to produce a modified vision transformer 712. The modified vision transformer 712 can be immediately deployed without further adjustment to its machine-trained weights 704. This is possible because the scoring and sampling functions 710 do not themselves rely on machine-trained weights. In other words, the scoring and sampling functions 710 operate on original attention information generated by attention components (which do use machine-trained weights), but the scoring sampling functions 710 themselves do not perform their functions based on their own machine-trained weights.

A developer may nevertheless choose to fine-tune the modified vision transformer 712 by re-training all of its weights (as shown in a third optional stage). This yields a fine-tuned vision transformer 714 having fine-tuned machine-trained weights 716. In still another scenario, a developer may choose to build the kind of vision transformer 102 shown in FIG. 1 from "scratch," that is, without starting with any type of pre-existing vision transformer.

FIG. 7 also serves to highlight additional advantages of the vision transformer 102 of FIG. 1. A developer can introduce the scoring and sampling functions 710 described herein to any existing vision transformer, regardless of its architecture. Further, the developer need not devote labor-intensive and resource-intensive operations to retrain an existing vision transformer that has been modified to include the scoring and sampling functions 710.

To repeat a point made at the outset of Section A, the principles described herein can be applied to other types of data items besides images. For example, consider the objective of classifying information presented in an audio item. The pre-processing system 104 can break the audio item into a plurality of audio tokens, e.g., corresponding to temporally-consecutive snippets of audio. Each audio token can describe features associated with a respective audio snippet, e.g., including mel-frequency cepstral coefficients, phonemes, word fragments, words, etc. The pre-processing system 104 can further append a classification token to the audio tokens. The transformer neural network 104 can use at least one modified attention component to remove attention values associated with the least valuable audio tokens (where value is assessed in terms of the capacity of an audio token to productively contribute to the classification of the audio item). For example, the modified attention component(s) can remove background noise in the audio item.

Further note that the principles set forth herein are applicable to the processing of item tokens having any informational scope. For example, the principles set forth herein apply to cases in which item tokens correspond to individual words, or word fragments identified by any kind of word-partitioning algorithm (e.g., the WordPiece algorithm), or even individual n-character sequences within words, etc.

Another way to convey the general applicability of the principles described herein is via FIG. 7. The scoring and sampling functions 710 shown there can be regarded as a data-agnostic and application-agnostic toolkit or utility that can be used to improve the efficiency of any transformer, regardless of the nature of data on which it operates, the way it represents that data, and the end-objectives of the transformer, etc.

B. Illustrative Processes

FIGS. 8-10 show processes that explain the operation of the vision transformer 102 of Section A in flowchart form. Since the principles underlying the operation of the vision transformer 102 have already been described in Section A, certain operations will be addressed in summary fashion in this section. Each flowchart is expressed as a series of operations performed in a particular order. But the order of these operations is merely representative, and can be varied in other implementations. Further, any two or more operations described below can be performed in a parallel manner. In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

More specifically, FIG. 8 shows a process 802 that represents one manner of operation of the pre-processing system 104 of FIG. 1. In block 804, the pre-processing system 104 obtains plural item tokens (e.g., image tokens 114) that represent parts of a data item (e.g., the image 116). In block 806, the pre-processing system 104 obtains the classification token 118. In block 808, the pre-processing system 104 converts the item tokens 114 and the classification token 118 into embedding vectors 110.

FIGS. 9 and 10 together show a process 902 that explains one manner of operation of the transformer neural network 106 of FIG. 1. In block 904, the transformer neural network 106 receives embedding vectors 110 that represent a plurality of item tokens (e.g., image tokens 114) generated based on a data item (e.g., the image 116), and the classification token 118. In blocks 906, 908, and 1002, the transformer neural network 106 performs an attention operation. The attention operation includes, in block 906, generating original attention information 212 based on the embedding vectors 110, the original attention information 212 having a plurality of attention values, each attention value describing an importance that a particular token plays in an interpretation of another particular token. In block 908, the transformer neural network 106 generates score information 216 based on attention values in the original attention information 212 that pertain to the classification token 118. In block 1002, the transformer neural network 106 generates modified attention information 218 by removing attention values from the original attention information 212 based on the score information 216. In block 804, the transformer neural network 106 performs subsequent operations based on the modified attention information 218. The subsequent operations perform fewer operations by using the modified attention information 218 rather than the original attention information 212.

C. Representative Computing Functionality

FIG. 11 shows an example of computing equipment that can be used to implement any of the systems summarized above. The computing equipment includes a set of user computing devices 1102 coupled to a set of servers 1104 via a computer network 1106. Each user computing device can correspond to any device that performs a computing function, including a desktop computing device, a laptop computing device, a handheld computing device of any type (e.g., a smartphone, a tablet-type computing device, etc.), a mixed reality device, a wearable computing device, an Internet-of-Things (IoT) device, a gaming system, and so on. The computer network 1106 can be implemented as a local area network, a wide area network (e.g., the Internet), one or more point-to-point links, or any combination thereof.

FIG. 11 also indicates that the training system 122 and the transformer 102 can be spread across the user computing devices 1102 and/or the servers 1104 in any manner. For instance, in some cases, the transformer 102 is entirely implemented by one or more of the servers 1104. Each user may interact with the servers 1104 via a user computing device. In other cases, the transformer 102 is entirely implemented by a user computing device in local fashion, in which case no interaction with the servers 1104 is necessary. In another case, the functionality associated with the transformer 102 is distributed between the servers 1104 and each user computing device in any manner.

Figure 12:
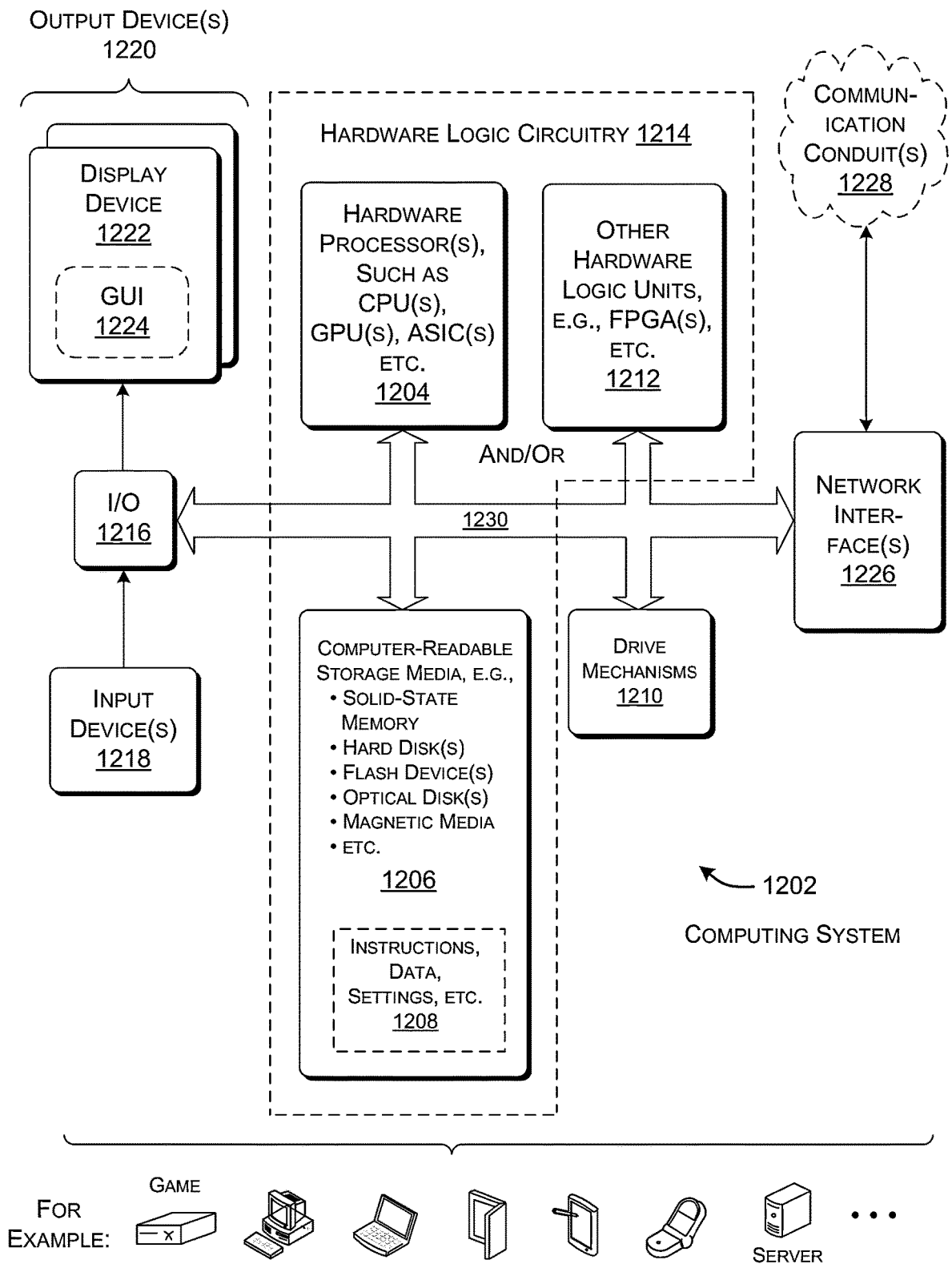
FIG. 12 shows an illustrative type of computing system that can be used to implement any aspect of the features shown in the foregoing drawings.

FIG. 12 shows a computing system 1202 that can be used to implement any aspect of the mechanisms set forth in the above-described figures. For instance, the type of computing system 1202 shown in FIG. 12 can be used to implement any user computing device or any server shown in FIG. 11. In all cases, the computing system 1202 represents a physical and tangible processing mechanism.

The computing system 1202 can include one or more hardware processors 1204. The hardware processor(s) 1204 can include, without limitation, one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any hardware processor can correspond to a general-purpose processing unit or an application-specific processor unit.

The computing system 1202 can also include computer-readable storage media 1206, corresponding to one or more computer-readable media hardware units. The computer-readable storage media 1206 retains any kind of information 1208, such as machine-readable instructions, settings, data, etc. Without limitation, the computer-readable storage media 1206 may include one or more solid-state devices, one or more magnetic hard disks, one or more optical disks, magnetic tape, and so on. Any instance of the computer-readable storage media 1206 can use any technology for storing and retrieving information. Further, any instance of the computer-readable storage media 1206 may represent a fixed or removable unit of the computing system 1202. Further, any instance of the computer-readable storage media 1206 may provide volatile or non-volatile retention of information.

More generally, any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se in transit, while including all other forms of computer-readable media.

The computing system 1202 can utilize any instance of the computer-readable storage media 1206 in different ways. For example, any instance of the computer-readable storage media 1206 may represent a hardware memory unit (such as Random Access Memory (RAM)) for storing transient information during execution of a program by the computing system 1202, and/or a hardware storage unit (such as a hard disk) for retaining/archiving information on a more permanent basis. In the latter case, the computing system 1202 also includes one or more drive mechanisms 1210 (such as a hard drive mechanism) for storing and retrieving information from an instance of the computer-readable storage media 1206.

The computing system 1202 may perform any of the functions described above when the hardware processor(s) 1204 carry out computer-readable instructions stored in any instance of the computer-readable storage media 1206. For instance, the computing system 1202 may carry out computer-readable instructions to perform each block of the processes described in Section B.

Alternatively, or in addition, the computing system 1202 may rely on one or more other hardware logic units 1212 to perform operations using a task-specific collection of logic gates. For instance, the hardware logic unit(s) 1212 may include a fixed configuration of hardware logic gates, e.g., that are created and set at the time of manufacture, and thereafter unalterable. Alternatively, or in addition, the other hardware logic unit(s) 1212 may include a collection of programmable hardware logic gates that can be set to perform different application-specific tasks. The latter class of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 12 generally indicates that hardware logic circuitry 1214 includes any combination of the hardware processor(s) 1204, the computer-readable storage media 1206, and/or the other hardware logic unit(s) 1212. That is, the computing system 1202 can employ any combination of the hardware processor(s) 1204 that execute machine-readable instructions provided in the computer-readable storage media 1206, and/or one or more other hardware logic unit(s) 1212 that perform operations using a fixed and/or programmable collection of hardware logic gates. More generally stated, the hardware logic circuitry 1214 corresponds to one or more hardware logic units of any type(s) that perform operations based on logic stored in and/or otherwise embodied in the hardware logic unit(s). Further, in some contexts, each of the terms "component," "module," "engine," "system," and "tool" refers to a part of the hardware logic circuitry 1214 that performs a particular function or combination of functions.

In some cases (e.g., in the case in which the computing system 1202 represents a user computing device), the computing system 1202 also includes an input/output interface 1216 for receiving various inputs (via input devices 1218), and for providing various outputs (via output devices 1220). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers, gyroscopes, etc.), and so on. One particular output mechanism may include a display device 1222 and an associated graphical user interface presentation (GUI) 1224. The display device 1222 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing system 1202 can also include one or more network interfaces 1226 for exchanging data with other devices via one or more communication conduits 1228. One or more communication buses 1230 communicatively couple the above-described units together.

The communication conduit(s) 1228 can be implemented in any manner, e.g., by a local area computer network, a wide area computer network (e.g., the Internet), point-to-point connections, etc., or any combination thereof. The communication conduit(s) 1228 can include any combination of hardwired links, wireless links, routers, gateway functionality, name servers, etc., governed by any protocol or combination of protocols.

FIG. 12 shows the computing system 1202 as being composed of a discrete collection of separate units. In some cases, the collection of units corresponds to discrete hardware units provided in a computing device chassis having any form factor. FIG. 12 shows illustrative form factors in its bottom portion. In other cases, the computing system 1202 can include a hardware logic unit that integrates the functions of two or more of the units shown in FIG. 1. For instance, the computing system 1202 can include a system on a chip (SoC or SOC), corresponding to an integrated circuit that combines the functions of two or more of the units shown in FIG. 12.

The following summary provides a non-exhaustive set of illustrative examples of the technology set forth herein.

(A1) According to a first aspect, some implementations of the technology described herein includes a method (e.g., the processes 802 and 902) for processing a data item (e.g., an image). The method includes: obtaining (e.g., 804) plural item tokens (e.g., image tokens) that represent the data item; obtaining (e.g., 806) a classification token; and converting (e.g., 808) the item tokens and the classification token into embedding vectors. In an attention operation, the method uses a transformer neural network (e.g., 106) for: generating (e.g., 906) original attention information based on the embedding vectors, the original attention information having a plurality of attention values, each attention value describing an importance that a particular token plays in an interpretation of another particular token; generating (e.g., 908) score information based on attention values in the original attention information that pertain to the classification token; and generating (e.g., 1002) modified attention information by removing attention values from the original attention information, as guided by a sampling operation that is performed based on the score information. The method then involves performing (e.g., 1004) subsequent operations in the transformer neural network based on the modified attention information. The subsequent operations perform fewer operations by using the modified attention information rather than the original attention information.

(A2) According to some implementations of the method of A1, the data item is an image, and the item tokens are image tokens that represent respective parts of the image.

(A3) According to some implementations of the method of A1, the item tokens represent parts of a feature map produced by performing a convolution operation on the data item.

(A4) According to some implementations of any of the methods of A1-A3, the transformer neural network includes plural encoder blocks, wherein a particular encoder block of the plural encoder blocks performs the attention operation.

(A5) According to some implementations of any of the methods of A1-A3, the transformer neural network includes plural encoder blocks, and wherein two or more of the plural encoder blocks perform instances of the attention operation.

(A6) According to some implementations of any of the methods of A1-A5, the transformer neural network outputs transformer output information, and wherein the method further comprises classifying item content in the data item based on the transformer output information.

(A7) According to some implementations of any of the methods of A1-A6, the sampling operation includes choosing no more than a prescribed number of item tokens based on the score information, the prescribed number being less than a total number of item tokens.

(A8) According to some implementations of any of the methods of A1-A6, the sampling operation includes choosing item tokens using inverse transform sampling based on the score information.

(A9) According to some implementations of any of the methods of A1-A6, the sampling operation includes: ordering individual scores of the score information by score magnitudes, to provide ordered score information; generating a cumulative distribution function based on the ordered score information; and non-uniformly selecting item tokens using the cumulative distribution function.

(A10) According to some implementations of any of the method of A1-A9, the original attention information is expressed as an array of the attention values, and wherein the operation of generating modified attention information removes one or more groups (e.g., one or more rows) of attention values in the original attention information.

(A1) According to some implementations of any of the methods of A1-A3, the operation of generating score information and the operation of generating modified attention information are functions of the transformer neural network that do not have their own machine-trained weights.

(B1) According to another illustrative aspect, another method (e.g., the processes 802 and 902) is described for processing a data item (e.g., the image 116) using a transformer neural network (e.g., 106). The method includes: receiving (e.g., 904) embedding vectors that represent a plurality of item tokens generated based on a data item, and a classification token. In an attention operation, the method includes: generating (e.g., 906) original attention information based on the embedding vectors, the original attention information having a plurality of attention values, each attention value describing an importance that a particular token plays in an interpretation of another particular token; generating (e.g., 908) score information based on attention values in the original attention information that pertain to the classification token; and generating (e.g., 1002) modified attention information by removing attention values from the original attention information, as guided by a sampling operation that is performed based on the score information. The method further includes performing (e.g., 1004) subsequent operations based on the modified attention information. The subsequent operations perform fewer operations by using the modified attention information rather than the original attention information.

(B2) According to some implementations of the method of (B1), the method is performed on a basis of machine-trained weights, the machine-trained weights governing the operation of generating original attention information, but not describing functions performed by the operation of generating score information and the operation of generating modified attention information.

In yet another aspect, some implementations of the technology described herein include a computing system (e.g., computing system 1202). The computing system includes hardware logic circuitry (e.g., 1214) that is configured to perform any of the methods described herein (e.g., any of the methods A1-A11 and B1-B2).

In yet another aspect, some implementations of the technology described herein include a computer-readable storage medium (e.g., the computer-readable storage media 1206) for storing computer-readable instructions (e.g., 1208). The computer-readable instructions, when executed by one or more hardware processors (e.g., 1204), perform any of the methods described herein (e.g., methods of A1-A11 and B1-B2). The computer-readable instructions can also implement the first attention-based neural network, the second attention-based neural network, and the scoring neural network.

More generally stated, any of the individual elements and steps described herein can be combined, without limitation, into any logically consistent permutation or subset. Further, any such combination can be manifested, without limitation, as a method, device, system, computer-readable storage medium, data structure, article of manufacture, graphical user interface presentation, etc. The technology can also be expressed as a series of means-plus-format elements in the claims, although this format should not be considered to be invoked unless the phase "means for" is explicitly used in the claims.

As to terminology used in this description, the phrase "configured to" encompasses various physical and tangible mechanisms for performing an identified operation. The mechanisms can be configured to perform an operation using the hardware logic circuity 1214 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. Finally, the terms "exemplary" or "illustrative" refer to one implementation among potentially many implementations.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for processing a data item, comprising:
   obtaining plural item tokens that represent the data item;
   obtaining a classification token; and
   converting the item tokens and the classification token into embedding vectors;
   in an attention operation, using a transformer neural network for: generating original attention information based on the embedding vectors, the original attention information having a plurality of attention values, each attention value describing an importance that a particular token plays in an interpretation of another particular token; generating score information based on attention values in the original attention information that pertain to the classification token; and generating modified attention information by removing attention values from the original attention information, as guided by a sampling operation that is performed based on the score information; and
   performing subsequent operations in the transformer neural network based on the modified attention information,
   the subsequent operations performing fewer operations by using the modified attention information rather than the original attention information.

2. The computer-implemented method of claim 1, wherein the data item is an image, and wherein the item tokens are image tokens that represent respective parts of the image.

3. The computer-implemented method of claim 1, wherein the item tokens represent parts of a feature map produced by performing a convolution operation on the data item.

4. The computer-implemented method of claim 1, wherein the transformer neural network includes plural encoder blocks, wherein a particular encoder block of the plural encoder blocks performs the attention operation.

5. The computer-implemented method of claim 1, wherein the transformer neural network includes plural encoder blocks, and wherein two or more of the plural encoder blocks perform instances of the attention operation.

6. The computer-implemented method of claim 1, wherein the transformer neural network outputs transformer output information, and wherein the method further comprises classifying item content in the data item based on the transformer output information.

7. The computer-implemented method of claim 1, wherein the sampling operation comprises choosing no more than a prescribed number of item tokens based on the score information, the prescribed number being less than a total number of item tokens.

8. The computer-implemented method of claim 1, wherein the sampling operation comprises choosing item tokens using inverse transform sampling based on the score information.

9. The computer-implemented method of claim 1, wherein the sampling operation comprises:
   ordering individual scores of the score information by score magnitudes, to provide ordered score information;
   generating a cumulative distribution function based on the ordered score information; and
   non-uniformly selecting item tokens using the cumulative distribution function.

10. The computer-implemented method of claim 1, wherein the original attention information is expressed as an array of the attention values, and wherein said generating modified attention information removes one or more groups of attention values in the original attention information.

11. The computer-implemented method of claim 1, wherein said generating score information and said generating modified attention information are functions of the transformer neural network that do not have their own machine-trained weights.

12. A transformer neural network, comprising:
   hardware logic circuitry configured to perform operations based on a set of machine-trained weights, the operations including:
   receiving embedding vectors that represent a plurality of item tokens generated based on a data item, and a classification token;
   in an attention operation: generating original attention information based on the embedding vectors, the original attention information having a plurality of attention values, each attention value describing an importance that a particular token plays in an interpretation of another particular token; generating score information based on attention values in the original attention information that pertain to the classification token; and generating modified attention information by removing attention values from the original attention information, as guided by a sampling operation that is performed based on the score information; and
   performing subsequent operations based on the modified attention information,
   the subsequent operations performing fewer operations by using the modified attention information rather than the original attention information.

13. The transformer neural network of claim 12, wherein the transformer neural network includes plural encoder blocks, wherein a particular encoder block of the plural encoder blocks performs the attention operation.

14. The transformer neural network of claim 12, wherein the transformer neural network includes plural encoder blocks, and wherein two or more of the plural encoder blocks perform instances of the attention operation.

15. The transformer neural network of claim 12, wherein the sampling operation comprises choosing no more than a prescribed number of item tokens based on the score information, the prescribed number being less than a total number of item tokens.

16. The transformer neural network claim 12, wherein the sampling operation comprises choosing item tokens using inverse transform sampling based on the score information.

17. The transformer neural network of claim 12, wherein the sampling operation comprises:
   ordering individual scores of the score information by score magnitudes, to provide ordered score information;
   generating a cumulative distribution function based on the ordered score information; and non-uniformly selecting item tokens using the cumulative distribution function.

18. The transformer neural network of claim 12, wherein the original attention information is expressed as an array of attention values, and wherein said generating modified attention information produces the modified attention information by removing one or more groups of attention values in the original attention information.

19. The transformer neural network of claim 12, wherein said generating score information and said generating modified attention information are functions of the transformer neural network that do not have their own machine-trained weights.

20. A non-transitory computer-readable storage medium for storing computer-readable instructions, the computer-readable instructions, when executed by one or more hardware processors, performing a method that comprises:

receiving embedding vectors that represent a plurality of item tokens generated based on a data item, and a classification token;

generating original attention information based on the embedding vectors, the original attention information having a plurality of attention values, each attention value describing an importance that a particular token plays in an interpretation of another particular token;

generating score information based on attention values in the original attention information that pertain to the classification token;

generating modified attention information by removing attention values from the original attention information, as guided by a sampling operation that is performed based on the score information;

performing subsequent operations in the transformer neural network based on the modified attention information, to produce output information, the method being performed on a basis of machine-trained weights, the machine-trained weights governing said generating original attention information, but not describing functions performed by said generating score information and said generating modified attention information.

* * * * *